Nov. 3, 1925.
B. BART
METHOD OF GRINDING GLASS MOLDS
Filed Jan. 11, 1923
1,560,033
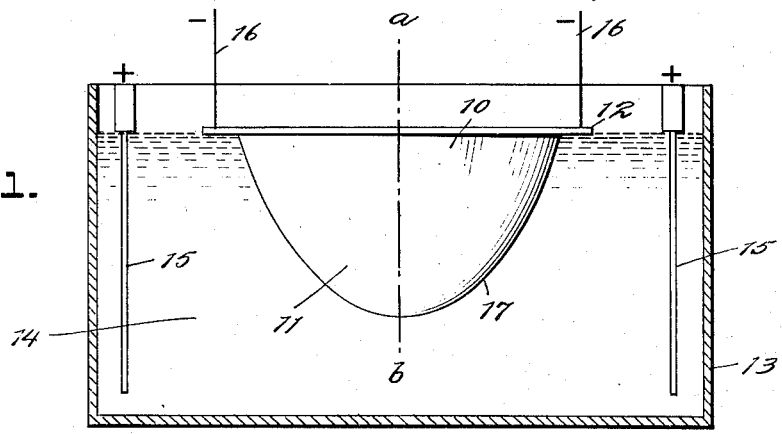
Fig.1.
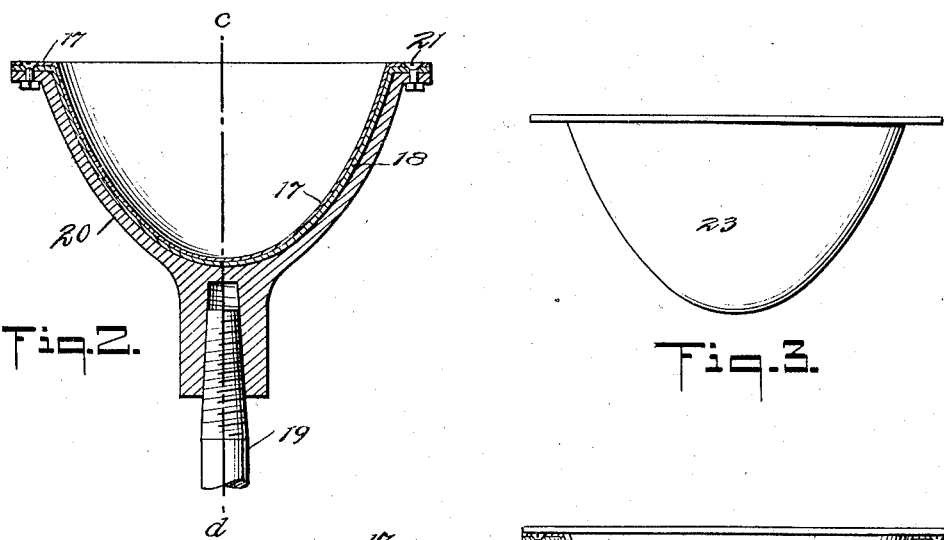
Fig.2.
Fig.3.
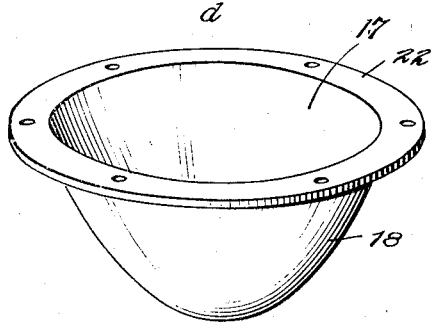
Fig.4.
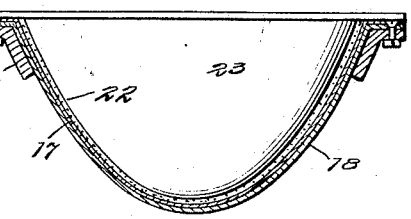
Fig.5.
INVENTOR
Blasius Bart
BY
Warren S. Orton
ATTORNEYS Patented Nov. 3, 1925.

1,560,033

UNITED STATES PATENT OFFICE.

BLASIUS BART, OF EAST ORANGE, NEW JERSEY.

METHOD OF GRINDING GLASS MOLDS.

Application filed January 11, 1923. Serial No. 612,133.

To all whom it may concern:

Be it known that I, BLASIUS BART, a citizen of the Republic of Switzerland, and resident of East Orange, in the county of Essex and State of New Jersey, have invented certain new and useful Improvements in Methods of Grinding Glass Molds, of which the following is a specification.

The invention relates in general to an improvement in the art of truing articles exactly to a preset configuration by a grinding operation, and the invention specifically relates to an improved method, for accurately forming, or rather truing by a grinding operation, articles which are required to have an accurately designed configuration. In the specific embodiment of the invention herein selected for illustration reference will be made to the grinding of glass molds for use in forming metallic reflectors of the type generally termed parabolic reflectors and which are required to be accurately formed, and in forming such reflectors it is customary practice to use a multiplicity of glass molds all of which must be identical with each other or at least all of the surfaces which determine the shape of the reflective surface must be identical. However the disclosure is equally applicable to the formation of other glass and similar articles and as one example the method may be used to form lenses and other optical instruments.

The glass molds or forms heretofore used in forming parabolic, as well as like shaped reflectors, and other similar articles, were extremely difficult to make. Mold after mold had to be discarded, due to imperfections developed during the finishing process and as a result the price of a perfected mold was almost prohibitive. In the method as previously practiced the glass molds which were cast or pressed approximately to shape were ground in a rotating form known as a grinding chuck. The grinding surfaces of such chucks were formed of iron and of course every possible effort has been made to have the iron grinding surface conform exactly to the configuration desired on the glass mold. Any perfection which might be found in any of these chuck surfaces was largely a matter of accident. Generally it was found that when the glass molds were subjected to the grinding action of these iron chucks the ground surfaces did not correspond exactly to the desired configuration and attempts to polish out the irregularities by hand not infrequently resulted in a worse distortion from the desired configuration than was originally present. In such cases the mold had to be discarded and the operation started all over again in another attempt to form a perfect mold. This failure of the old method was probably due to a combination of circumstances, among which may be mentioned that the iron chucks possessed minute air holes which left their impression on the polished mold; may be due to the fact that for some reason iron cannot be made to adhere closely to the master mold upon which the iron chucks were formed; and may be due to the fact that the iron particles were not sufficiently fine or homogeneous to provide the smoothness of grinding surface necessary to the accurate formation of these glass molds.

Accordingly the primary object of the invention is to provide a simple, efficient and easily practical means for accurately truing a grindable surface to correspond exactly to a preformed shape.

Broadly this object is attained by providing a master mold having a shaping surface with the desired configuration; forming a grinding chuck tool with a surface the exact complement of said mold surface and then subjecting the articles to be ground to the grinding action of said complementary surface functioning as the tool of a grinding chuck.

Incidental to the desideratum of forming a grinding surface to the chuck which will be an exact duplicate of the master mold, an incidental object of the invention is to provide the grinding surface of fine, homogeneous particles cohering to produce a smooth continuous surface corresponding in the minutest details to the surface of the mold.

I attain this phase of the invention by depositing the metal as fine particles on the mold surface either by depositing an atomized stream of metal on the mold, or preferably, by forming on the mold a thin metal coating by electrolytic precipitation. Copper is herein suggested as the preferred metal due to its fine texture; due to its capacity to reproduce faithfully the mold surfaces in all its details and due to the effectiveness of the smooth surface when formed of electro-chemically deposited copper as a grinding agent.

In the known methods of grinding glass molds of the type used in forming parabolically shaped reflectors, it has not been commercially possible to provide reflectors with integrally formed, outstanding flanges due to the fact that it was impossible to grind a correspondingly shaped glass mold provided with a flange forming a flat surface.

Another object of the present invention is to provide a means for accurately grinding a glass mold or similar article formed of a combination of curved and flat surfaces and further to attain the grinding by acting simultaneously on both the curved and flat portions of the surface under treatment. More specifically stated an object of this phase of the invention is to provide an improved means for grinding a glass mold which in axial cross-section is a conic section or more definitely, parabolic, with a flange outlining the curved portion of the mold.

Another object of the invention is to provide a simplified method of grinding which will feature economy in the use of the tool element of the grinding chuck, which will permit the simultaneous grinding of a plurality of pieces of work, which will minimize the tendency of the work to score or wear away chuck surface unevenly, and which will tend to bring the work quickly to the desired configuration with the least possible distortion of the tool from its original preset configuration.

Various other objects and advantages of the invention will be in part obvious from a consideration of the method features of the disclosure and from an inspection of the accompanying drawings and in part will be more fully set forth in the following particular description of one method of practicing the invention, and the invention also consists in certain new and novel modifications of the preferred method and other features of construction and combinations of parts hereinafter set forth and claimed.

In the accompanying drawings there is illustrated a plurality of instrumentalities by means of which the method features of the disclosure may be practiced efficiently and economically.

In the drawings:

Figure 1 is a view largely in diagrammatic outline of an electrolytic tank illustrating a step in the method of forming on a master mold the grinding surface of the tool chuck featured in the disclosure herein.

Figure 2 is a view largely in axial section of a grinding chuck equipped with a grinding tool formed in part by the method suggested in Figure 1, it being understood that Figure 2 illustrates one of a set of such chucks of which five or six constitute the complete grinding apparatus used in following the method herein disclosed.

Figure 3 is a view in side elevation of the mold to be ground.

Figure 4 is a perspective view of the grinding tool shown in Figure 2 and detached from the chuck; and Figure 5 is a transverse sectional view taken axially through the tool and shown in grinding relation to the mold shown in Fig. 3 to be trued.

In the following description and in the claims, parts will be identified by specific names for convenience of expression but they are intended to be as generic in their application to similar parts as the art will permit.

In practicing the method it will of course be necessary to provide, either by hand or by following the method herein suggested, a master mold of the desired configuration. Usually this master mold will be found to be quite expensive to construct, especially where the mold is intended to be used in those situations, such as in optical work, where it is required that the work surface be accurately formed to some desired measurement and configuration. In the present disclosure where the resulting mold is intended to be used to form a parabolic metallic reflector, there is shown at 10 a glass mold having a definite and exactly constructed form. In this instance there has been selected for illustration a form of mold which has a convexed curved central portion 11 symmetrically disposed with reference to an axis $a-b$ and parabolic in cross-section in any plane containing the line $a-b$. The curved portion is provided with an outstanding flange 12 flat on the side continuous with the adjacent convex side of the curved portion. This particular form has been selected for illustration due to the fact that heretofore it has not been possible to grind any such combination of curved and flat surfaces.

Following the usual practice of electrolytic precipitation, the master mold 10 is positioned in an electrolytic tank 13, such for instance as a tank containing copper electrolyte 14 with copper anode plates 15 and there subjected to the usual copper precipitation by electric current admitted to the tank through leads 16. A thin, bowl-shaped layer 17 of copper is formed on the curved and adjacent flat faces of the mold and the electrolytic precipitation is continued until a layer of the desired thickness is provided. On the ground of economy, however, this copper layer will be extremely thin, usually an amount merely sufficient to cover the mold completely, about twenty-five thousandths of an inch. Under some circumstances the copper layer is strengthened in any manner in which thin metallic shells are strengthened, and it is herein suggested that an outer layer of nickel 18 may be precipitated electrolytically on the back of the copper layer. This is done usually by transferring the mold with its copper coating to a nickel depositing tank where a desired thickness of nickel is formed on the back of the copper.

The inner copper layer, hereinafter referred to as a grinding tool, with or without the nickel backing, is removed from the master mold preferably by pouring warm water over the layer. The heat from the hot water causes the thin metal to expand and due to difference in co-efficient of expansion between metal and glass the metal shell separates readily from the glass especially when the insertion of a knife between the metal layer and the glass permits the entrance of air between the glass and the coating.

The tool thus formed is placed in a grinding chuck of conventional design and one form of which is shown in outline in Figure 2. This chuck includes a driving shaft 19 on which is fitted an iron bowl 20, which corresponds somewhat to the old grinding chuck and is of course formed approximately to shape so as to receive with a fairly snug fit the tool for which it is intended. A tool formed as described is fastened to the iron bowl usually by means of screws 21 passed through the flange 22 of the tool and into the periphery of the bowl 20. The chuck is thus equipped for operation and is designated to rotate usually at low speed about an axis of rotation indicated by the line c—d and which is co-incident with the line a—b in so far as the tool is concerned.

In arranging for a grinding operation it will be understood that a set of these chucks is provided and it is herein suggested that five or six chucks are necessary to attain the most perfect results. All of the grinding surfaces of these chucks are made on the same master mold and by following the method herein outlined, it will be found that each grinding surface is an exact duplicate of every other grinding surface in the set. A glass mold 23 to be ground and which has been molded or pressed approximately to shape is positioned in the first chuck of the set and subjected to a usual grinding operaion. While in the first chuck the grinding takes place with a relatively coarse abrasive, such for instance, as emery and water. However, it is permitted to remain therein only for a limited period of time. The partially ground mold is then removed from the first chuck and placed in position in the tool of the second chuck to be ground by the action of the second chuck. The mold is subjected while in the second chuck to grinding action for a short period of time and in the presence of an abrasive which is slightly finer than the abrasive used in the first chuck. The second tool will of course act on a part of the mold different from the part first attacked by the first tool. The operation is continued, the partially ground mold being placed successively in each chuck together with the progressively finer abrasives and the time necessary to effect the complete grinding of the mold is apportioned among the several chucks so that the last chuck in the series has little, if any, grinding effect upon the mold under treatment. In this way it will be understood that the first chuck simply acts upon the high points or portions of the mold which are most distorted from the final configuration and will tend to bring these high points down to the proper shape desired of the finished mold. Of course, the mold will react on the grinding surface and tend to wear away that portion of the grinding surface which is in contact with the high points. The wear on each grinding tool will be progressively less from the beginning to the end of the series, and accordingly the greatest amount of wear will take place on the first surface in the set. When the first grinding tool becomes worn, or rather modified from its original shape, the entire tool is discarded and replaced by the grinding tool of the second chuck of the series and in this way each other chuck is periodically promoted one step in the series. A fresh grinding tool is positioned in the vacant, last chuck of the series and the operation is continued, discarding the first tool, promoting the others from time to time and inserting a new tool to fill the last chuck.

As each chuck in the series is worn or scored at a different place, the following of the method herein suggested would mean the utilization of practically the entire working face of each of the tools until it begins to vary from its preset shape.

Following the method herein disclosed, it is possible to provide a mold which will be absolutely symmetrical with reference to an axis passing centrally through the same and every mold will be an exact replica of every other mold so formed. It will of course follow that every reflector or other form of metallic shell formed on these molds, by methods forming no part of the present disclosure, will correspond exactly in configuration to each other and to the master mold. As the flanged portion of the mold as well as the curved portion are accurately ground it will result that the flange on the resulting reflector will likewise be accurately positioned with respect to the optic axis of the reflector and with reference to other lines and points of reference usually referred to in designing optical apparatus.

A beautiful polish is formed on the treated surface of the mold with the result that when a silver deposit, for instance, is electrolytically positioned on the polished mold surface, there is produced a reflecting surface of intense brilliancy with an extremely high reflecting capacity.

The copper surface, especially when formed electrolytically, follows the master mold surface exactly and therefore provides a grinding surface which is an exact and faithful reproduction of the master mold surface. As this copper facing need be of only small thickness the method features economy both in the use of the metal and in necessary current consumption to form the deposit. The most important advantage, however, in connection with this method is the saving in cost of forming the trued glass mold. It has been possible to construct molds as exact copies of master molds for less than one per cent of the cost of such molds when produced by the most improved known methods.

I claim:

1. An improvement in the art of producing three-dimension facsimiles, accurate to molecular proportions, which consists in the formation of a succession of metal shells by molecular precipitation of each directly upon the same mold, and abrading an article having the general contour of said mold by the application of one after another of said shells until a correspondence such as exists between the mold and shells is attained between the abraded article and an unabraded shell.

2. An improvement in the art of producing three-dimension facsimiles which consists in the formation of a succession of shells by deposition of each directly upon the same mold, such mold being provided with a portion other than the contour surface which is to be reproduced in the finished article, and in the formation of each shell by said deposition, a counterpart of said portion being similarly produced, and an article of the same general contour of the mold being abraded successively by each of a set of such shells, and the portion of said shell other than the contour to be reproduced being used as a reference or locating surface for accurately positioning the contour producing surface of said shell.

3. The improvement in the art of producing three-dimension facsimiles, which consists in the formation of a succession of shells by deposition of each directly upon the same mold, and abrading an article having the general contour of said mold by one after another of a set of said shells until a correspondence such as exists between the mold and the shells is attained between the article and an unabraded shell, and supplying, as required to secure accuracy in the product, a previously unused shell as the final abrading shell, and relatively advancing the others in regard to the completion of the operation and discarding the shell first used when it becomes worn.

Signed at New York city in the county of New York and State of New York this 23rd day of December, A. D. 1922.

BLASIUS BART.